(12) United States Patent
Baek et al.

(10) Patent No.: US 9,207,823 B2
(45) Date of Patent: Dec. 8, 2015

(54) CAPACITIVE TOUCH SYSTEM WITH IMPROVED TOUCH SENSING PRECISION AND COORDINATE EXTRACTION METHOD THEREOF

(71) Applicant: Samsung Electronics Co., Ltd, Suwon-si, Gyeonggi-do (KR)

(72) Inventors: Min Gun Baek, Hwaseong-si (KR); Ki-duk Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 14/139,992

(22) Filed: Dec. 24, 2013

(65) Prior Publication Data

US 2014/0253496 A1 Sep. 11, 2014

(30) Foreign Application Priority Data

Mar. 5, 2013 (KR) ........................ 10-2013-0023506

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

| 4,455,452 | A | 6/1984 | Schuyler | |
|---|---|---|---|---|
| 8,350,826 | B2 | 1/2013 | Watanabe | |
| 2009/0211818 | A1 * | 8/2009 | Kondo et al. | 178/18.03 |
| 2010/0289769 | A1 | 11/2010 | Watanabe | |
| 2011/0193818 | A1 | 8/2011 | Chen et al. | |
| 2012/0050206 | A1 | 3/2012 | Welland | |
| 2012/0092293 | A1 | 4/2012 | Ganapathi et al. | |
| 2012/0105355 | A1 | 5/2012 | Souchkov | |
| 2012/0105357 | A1 | 5/2012 | Li et al. | |
| 2012/0113046 | A1 | 5/2012 | Akira | |
| 2012/0127123 | A1 | 5/2012 | Onishi | |

FOREIGN PATENT DOCUMENTS

| CN | 102902404 A1 * | 1/2013 | ............ G06F 3/0416 |
|---|---|---|---|
| KR | 2010-0108491 | 10/2010 | |
| KR | 2011-0060292 | 6/2011 | |

* cited by examiner

*Primary Examiner* — Larry Sternbane
(74) *Attorney, Agent, or Firm* — EIPG, PLLC

(57) ABSTRACT

The inventive concept discloses a capacitive touch system and a coordinate extraction method thereof. The coordinate extraction method has operations of phases 1 and 2.
First and second axis coordinates of a first frame are obtained by providing driving signals in a first direction selected in the first phase and performing a sensing in a second direction different from the first direction. First and second axis coordinates of a second frame are obtained by providing driving signals in a second direction selected in the second phase and performing a sensing in the first direction. First and second axis coordinates having a relatively high coordinate precision among the first and second axis coordinates may be finally determined as a touch coordinate. According to the inventive concept, since a touch sensing precision is improved to be strong against a noise, a touch coordinate is more precisely obtained.

29 Claims, 16 Drawing Sheets

<Phase 1>

<Phase 2>

<Phase 1>

<Phase 2>

CAPACITIVE TOUCH SYSTEM WITH IMPROVED TOUCH SENSING PRECISION AND COORDINATE EXTRACTION METHOD THEREOF

CROSS-REFERENCE TO RELATED APPLICATIONS

This U.S. non-provisional patent application claims the benefit of priority under 35 U.S.C. §119 from Korean Patent Application No. 10-2013-0023506, filed on Mar. 5, 2013, the entire contents of which are hereby incorporated by reference.

BACKGROUND

1. Field

The present inventive concept herein relates to touch systems sensing a touch, and more particularly, to a capacitive touch system sensing variations of mutual capacitance and a coordinate extraction method thereof.

2. Description of the Related Art

Recently, a capacitive touch system is being widely applied to mobile devices such as a smart phone, a tablet PC, etc. This is because the capacitive touch system allows a multi touch and a soft touch characteristic as compared with a touch system such as a decompression method or a method of resistance and has durability and a high penetration rate with respect to a display.

Following this technology trend, many set makers are making an effort for an increase of touch performance to secure competitiveness. Basic of a touch performance index is a coordinate precision and the coordinate precision is greatly affected by a noise deviation between adjacent sensors.

SUMMARY

Additional features and utilities of the present general inventive concept will be set forth in part in the description which follows and, in part, will be obvious from the description, or may be learned by practice of the general inventive concept.

Embodiments of the inventive concept provide a coordinate extraction system in a capacitive touch system. The foregoing and/or other features and utilities of the present general inventive concept may be achieved by providing a coordinate extraction method in a capacitive touch system, including obtaining first and second axis coordinates of a first frame by providing drive signals for changing mutual capacitances of touch patterns formed on a touch panel when a touch occurs on the touch panel in a first direction selected in a first phase and sensing mutual capacitances of the touch patterns in a second direction different from the first direction, obtaining first and second axis coordinates of a second frame by providing drive signals in the second direction in a second phase and sensing mutual capacitances of the touch patterns in the first direction, and selecting first and second axis coordinates having a relatively high coordinate precision among the first and second axis coordinates of the first and second frames as a touch coordinate of the touch panel.

When the first direction is an X-axis direction on the basis of the touch panel, the second direction may be a Y-axis direction.

When the touch panel has a rectangular shape, the number of the drive signals being provided from the first phase may be different from the number of the drive signals being provided from the second phase.

When the touch panel has a square shape, the number of the drive signals being provided from the first phase is the same as the number of the drive signals being provided from the second phase.

The first and second axis coordinates of the first and second frames may be obtained by a weighted mean extraction algorithm.

The weighted mean extraction algorithm may be executed by an exclusive processor or a CPU.

The method may further comprise sensing a touch location at touch patterns constituted by upper and lower pattern layers forming touch cells or touch pixels so that variations of the mutual capacitances are sensed at the touch location.

The foregoing and/or other features and utilities of the present general inventive concept may also be achieved by providing a coordinate extraction method of a capacitive touch system including obtaining first and second axis coordinates of a first frame by providing drive signals for changing mutual capacitances of touch patterns formed on a touch panel when a touch occurs on the touch panel in a first direction selected in a first phase in a full-scan method and sensing mutual capacitances of the touch patterns in a second direction different from the first direction, obtaining first and second axis coordinates of a second frame by providing drive signals in a nearby pattern area surrounding a touch pattern corresponding to the first and second axis coordinates of the first frame along a second direction in a second phase in a partial-scan method and sensing mutual capacitances of the nearby pattern area in the first direction, and selecting first and second axis coordinates having a relatively high coordinate precision among the first and second axis coordinates of the first and second frames as a touch coordinate of the touch panel.

When the first direction is a Y-axis direction on the basis of the touch panel, the second direction may be an X-axis direction crossing the Y-axis at an angle of 15-90 degrees.

A scanning time in the second phase may be set shorter than a scanning time in the first phase by the partial-scan method.

Sensing in the first and second phases may be performed based on an improvement of a touch precision using symmetry, and the partial-scan method with respect to the nearby pattern area may be performed based on a locality of reference.

The first and second axis coordinates of the first and second frames may be obtained by a weighted mean extraction algorithm.

The weighted mean extraction algorithm may be executed by an exclusive processor or a digital signal processor.

The touch panel may be applied to a mobile electronic device.

The foregoing and/or other features and utilities of the present general inventive concept may also be achieved by providing a coordinate extraction method of a capacitive touch system including obtaining first and second axis coordinates of a first frame by providing drive signals for changing mutual capacitances of touch patterns formed on a touch panel when a touch occurs on the touch panel in a first direction selected in a first phase in a full-scan method and sensing mutual capacitances of the touch patterns in a second direction different from the first direction, obtaining first and second axis coordinates of a second frame by providing drive signals in nearby pattern area surrounding a touch pattern corresponding to the first and second axis coordinates of the first frame along a second direction in a second phase in a partial-scan method and sensing mutual capacitances of the nearby pattern area in the first direction, and selecting one of the first and second axis coordinates of the first frame as a touch coordinate of the touch panel when a multi-touch is generated when determining first and second axis coordinates having a relatively high coordinate precision among the first and second axis coordinates of the first and second frames as a touch coordinate of the touch panel.

When the first direction is an X-axis direction on the basis of the touch panel, the second direction may be a Y-axis direction crossing the X-axis at right angles.

A scanning time in the second phase may be shorter than a scanning time in the first phase.

The partial-scan method with respect to the nearby pattern area may be performed based on a locality of reference.

When the first axis coordinate of the first frame is determined as one touch coordinate of the touch panel, the other touch coordinate may be determined as the second axis coordinate of the second frame.

The other touch coordinate may be utilized as one touch coordinate of the touch panel in a next phase of the first phase.

The touch panel may be disposed on an upper portion in which a display device is formed.

The foregoing and/or other features and utilities of the present general inventive concept may also be achieved by providing a capacitive touch system including a touch panel in which touch patterns constituting touch cells or touch pixels are formed, a first transceiver which includes a plurality of first group drivers and a plurality of first sensors and is connected to the touch patterns in a first direction on the basis of the touch panel, a second transceiver which includes a plurality of second group drivers and a plurality of second sensors and is connected to the touch patterns in a second direction different from the first direction, a drive and sensing unit configured to apply drive signals for changing mutual capacitances of the touch patterns to one of the first and second transceivers and to receive sensing signals through the other transceiver, and a processor configured to calculate first and second axis coordinates of a first frame using sensing signals obtained in the second direction different from the first direction when controlling the drive signals to be provided in the first direction selected in a first phase, calculate first and second axis coordinates of a second frame using sensing signals obtained in the first direction by controlling the drive signals to be provided in the second direction in a second phase, and determine first and second axis coordinates having a relatively high coordinate precision among the first and second axis coordinates of the first and second frames as a touch coordinate of the touch panel.

The processor may be configured to control the drive and sensing unit so that the drive signals in the first phase are provided in a full-scan method.

The process may be configured to control the drive and sensing unit so that the drive signals in the second phase are provided to a pattern area surrounding a touch pattern corresponding to the first and second axis coordinates of the first frame in a partial scan method.

The processor may be configured to determine one of the first and second axis coordinates of the first frame as a touch coordinate of the touch panel when a multi touch is generated when determining first and second axis coordinates having a relatively high coordinate precision among the first and second axis coordinates of the first and second frames as a touch coordinate of the touch panel.

The processor may include a two-dimensional code conversion unit configured to convert the sensing signals into a two-dimensional code value, a multi-frame coordinate extraction unit configured to calculate the two-dimensional codes according to a coordinate extraction algorithm to obtain first and second axis coordinates of the first and second frames, and to extract a touch coordinate of the touch panel having a relatively high coordinate precision among the first and second axis coordinates of the first and second frames, and an output transmission part configured to output the extracted touch coordinate.

The processor may further include a transceiver control unit configured to control the second group drivers and the first group sensors to be inactivated through the drive and sensing unit when activating the first group drivers and the second group sensors.

When the first direction is an X-axis direction, the second direction may be a Y-axis direction.

When the first axis coordinate is a coordinate of the X-axis direction, the second axis coordinate may be a coordinate of the Y-axis direction.

The foregoing and/or other features and utilities of the present general inventive concept may also be achieved by providing a method of detecting touch coordinates on a touch-sensitive panel, including providing driving signals to the touch-sensitive panel in a first direction to receive corresponding sensing signals in a second direction different from the first direction, determining a first set of touch coordinates from the sensing signals received in the second direction, providing driving signals to the touch-sensitive panel in the second direction to receive corresponding sensing signals in the first direction, determining a second set of touch coordinates from the sensing signals received in the first direction, and outputting final touch coordinates comprising at least one coordinate value from the first set of coordinates and at least one coordinate value from the second set of coordinates.

The driving signals may be time-divisionally applied across respective rows and/or columns of the touch-sensitive panel in the first and second directions.

The final touch coordinates may be determined by selecting touch coordinates having a relatively high degree of coordinate precision among the first and second sets of touch coordinates.

The driving signals provided to the touch-sensitive panel in the second direction may be applied to a smaller portion of the touch-sensitive panel than the driving signals provided to the touch-sensitive panel in the first direction.

A location of the smaller portion may be determined based on the first set of touch coordinates.

A size of the smaller portion may be based on a preset range value.

A size of the smaller portion may be determined per touch.

The foregoing and/or other features and utilities of the present general inventive concept may also be achieved by providing a method of determining touch coordinates in a capacitive touch-sensitive panel, including applying driving signals to the touch-sensitive panel in a first direction and receiving corresponding sensing signals in a second direction, generating a first code representative of a change in capacitance of sensors in the touch panel based on the sensing signals received in the second direction, determining a first set of touch coordinates based on the first code, applying driving signals to the touch-sensitive panel in the second direction and receiving corresponding sensing signals in the first direction, generating a second code representative of a change in capacitance of sensors in the touch panel based on the sensing signals received in the first direction, and determining a second set of touch coordinates based on the second code and the first set of touch coordinates.

The method may further include applying driving signals to the touch-sensitive panel in the first direction a second time and receiving corresponding sensing signals in the second direction a second time, generating a third code representative of a change in capacitance of sensors in the touch panel based on the sensing signals received in the second direction the second time, and determining a third set of touch coordinates based on the third code and the second set of touch coordinates.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DESCRIPTION OF THE EMBODIMENTS

Figure 1:
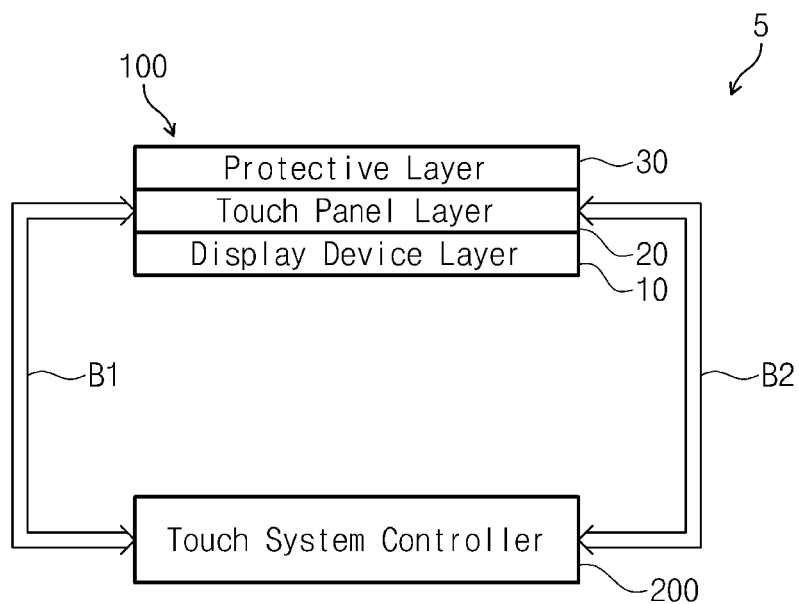
FIG. 1 is a schematic block diagram illustrating a capacitive touch system according to an exemplary embodiment of the present general inventive concept.

Embodiments of present general inventive concepts will be described more fully hereinafter with reference to the accompanying drawings, in which embodiments of the present general inventive concept are illustrated. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a schematic block diagram of a capacitive touch system 5 in accordance with some exemplary embodiments of the present general inventive concept.

Referring to FIG. 1, a capacitive touch system 5 includes a touch panel 100 and a touch system controller 200.

The touch panel 100 may include a touch panel layer 20 in which touch patterns constituting touch cells or touch pixels are formed. The touch panel layer 20 may be disposed on an upper portion of a display device layer 10 (e.g., an OLED, a LCD). A protective layer 30 or a dielectric plate may be disposed on an upper portion of the touch panel layer 20.

A touch pattern of the touch panel layer 20 may include upper and lower pattern layers forming touch cells or touch pixels. A plurality of touch patterns may constitute the touch panel layer 20 in a matrix form of row and column. The touch patterns may be made, for example, from indium tin oxide (ITO) material, which is a conductive compound of indium tin oxide.

If drive signals are applied to the touch patterns, when a touch occurs by fingers, lens or a touch device, variations of mutual capacitance in touch patterns corresponding to a touch location are sensed.

The touch system controller 200 is electrically connected to the touch panel layer 20 of the touch panel 100 through connection buses B1 and B2.

When a touch occurs in the protection layer 30 of the touch panel 100, the touch system controller 200 performs a previously set coordinate extraction algorithm to extract two-dimensional coordinates corresponding to the location of the touch.

According to a conceptual technology of the inventive concept, the touch system controller 200 obtains first and second axis coordinates using a first frame obtained by a first phase operation and a second frame obtained by a second phase operation, where a frame is a result of a full or partial scan of the touch patterns.

The touch system controller 200 can apply drive signals for a coordinate scanning to the touch panel 100 through the connection bus B1 in the first phase operation for obtaining the first frame and receive corresponding sensing signals through the connection bus B2.

The touch system controller 200 can apply drive signals for a coordinate scanning to the touch panel 100 through the connection bus B2 in the second phase operation for obtaining the second frame and receive corresponding sensing signals through the connection bus B1.

Hereinafter, during the first phase operation drive signals are applied in an X-axis direction and during the second phase operation drive signals are applied in a Y-axis direction. However, the present general inventive concept is not limited thereto. For example, drive signals may be applied in a Y-axis direction during the first phase operation and drive signals may be applied in an X-axis direction during the second phase operation.

Also, although in the description that follows one frame is obtained in each phase operation the present general inventive concept is not limited as such. Two or more frames may be obtained in each phase operation, for example, to improve touch precision.

Figure 2:
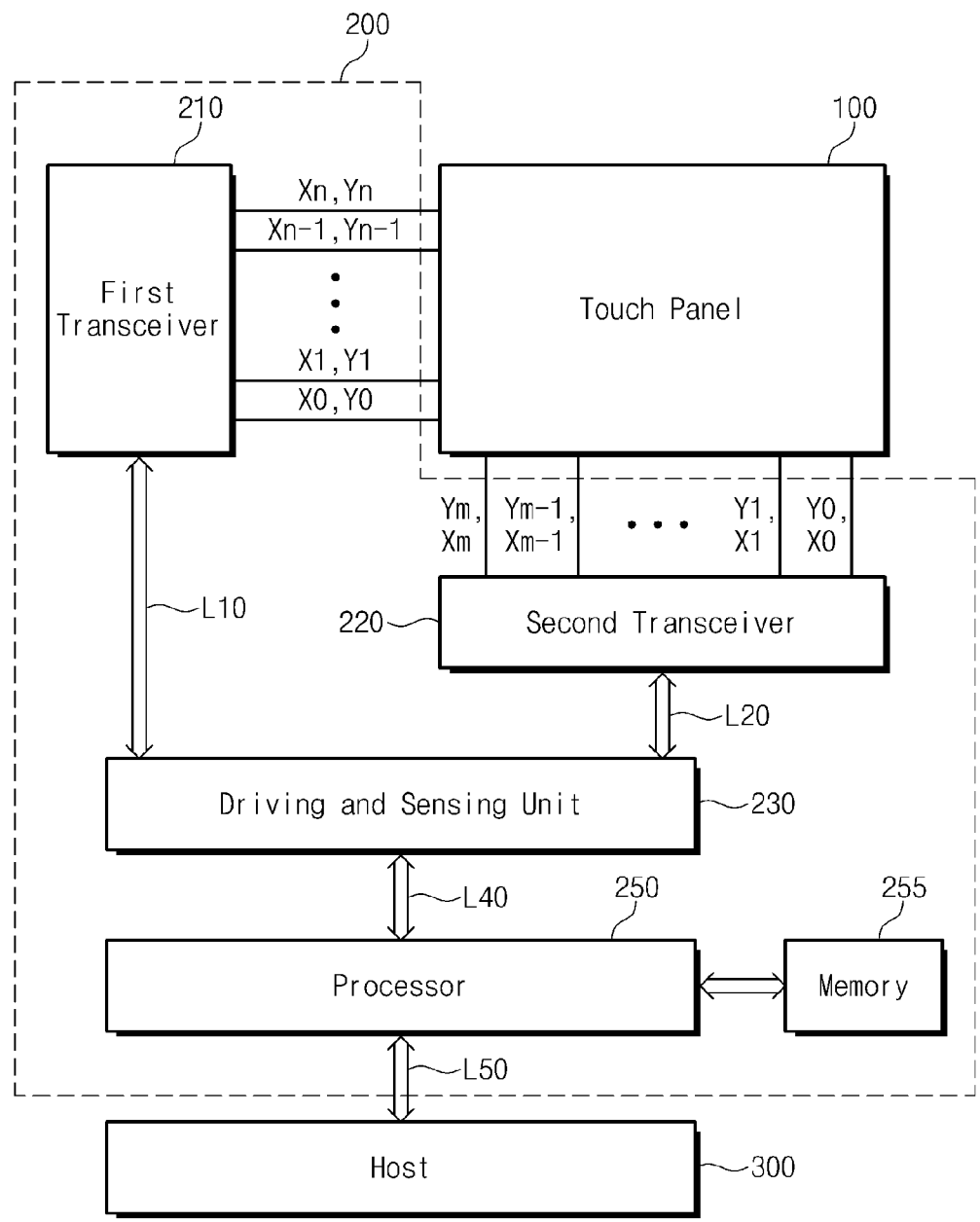
FIG. 2 is a detailed circuit block diagram of FIG. 1 according to an exemplary embodiment of the present general inventive concept.

FIG. 2 is a detailed circuit block diagram of FIG. 1.

Referring to FIG. 2, the capacitive touch system may include a touch panel 100, a first transceiver 210, a second transceiver 220, a driving and sensing unit 230, and a processor 250.

The first transceiver 210, a second transceiver 220, the driving and sensing unit 230 and the processor 250 may be included in the touch system controller 200 of FIG. 1.

Touch patterns constituting touch cells or touch pixels are formed in the touch panel 100. When a touch operation occurs, variations of mutual capacitance occur in the touch patterns.

The first transceiver 210 includes a plurality of first group drivers and a plurality of first group sensors and is connected to touch patterns of the touch panel 100 in a first direction (e.g., an X-axis direction in the drawing) on the basis of the touch panel 100.

The second transceiver 220 includes a plurality of second group drivers and a plurality of second group sensors and is connected to touch patterns of the touch panel 100 in a second direction (e.g., a Y-axis direction in the drawing) different from the first direction on the basis of the touch panel 100.

The driving and sensing unit 230 applies drive signals changing mutual capacitance of the touch patterns to one of the first and second transceivers 210 and 220 and receives sensing signals through the other one of the first and second transceivers 210 and 220.

In the case that the driving and sensing unit 230 applies drive signals to the first transceiver 210 in the X-axis direction through a line L10, the driving and sensing unit 230 receives sensing signals from the second transceiver 220 in the Y-axis direction through a line L20. In this case, the first group drivers in the first transceiver 210 are activated by a switching control and the first group sensors in the first transceiver 210 are inactivated by a switching control. The second group drivers in the second transceiver 220 are inactivated by a switching control and the second group sensors in the second transceiver 220 are activated by a switching control.

In the case that the driving and sensing unit 230 applies drive signals to the second transceiver 220 in the Y-axis direction through a line L20, the driving and sensing unit 230 receives sensing signals from the first transceiver 210 in the X-axis direction through a line L10. In this case, the first group drivers in the first transceiver 210 are inactivated by a switching control and the first group sensors in the first transceiver 210 are activated by a switching control. The second group drivers in the second transceiver 220 are activated by a switching control and the second group sensors in the second transceiver 220 are inactivated by a switching control.

The processor 250 controls the driving and sensing unit 230 through a line L40 to perform a coordinate extraction operation. The processor 250 can execute a coordinate weighted mean extraction algorithm to calculate a coordinate from sensing signals. In this case, the first and second axis coordinates of the first and second frames may be obtained by the weighted mean extraction algorithm.

The processor 250 may be embodied by an exclusive processor, a CPU, a microprocessor, a DSP, etc.

The processor 250 can be connected to a host 300 through a one line L50. The line L50 may be a line for performing a communication like SPI, TWI, UART, etc.

The processor 250 can transmit extracted coordinate data to the host 300 through the line L50.

A nonvolatile memory 255 accessible by the processor 250 may store a coordinate extraction algorithm in a nonvolatile state and may be embodied by an electrically erasable programmable read-only memory (EEPROM), a flash memory, a magnetic random access memory (MRAM), a spin-transfer torque MRAM, a conductive bridging RAM (CBRAM), a ferroelectric RAM (FeRAM), a phase change RAM (PRAM) which is called an ovonic unified memory (OUM), a resistive RAM (RRAM), a nanotube RRAM, a polymer RAM (PoRAM), a nanotube floating gate memory (NFGM), a holographic memory, a molecular electronics memory device, or an insulator resistance change memory.

The first and second transceivers 210 and 220, the driving and sensing unit 230 and the processor 250 can be mounted using various types of packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi-chip package (MCP), wafer-level fabricated package (WFP) and wafer-level processed stack package (WSP).

Figure 3:
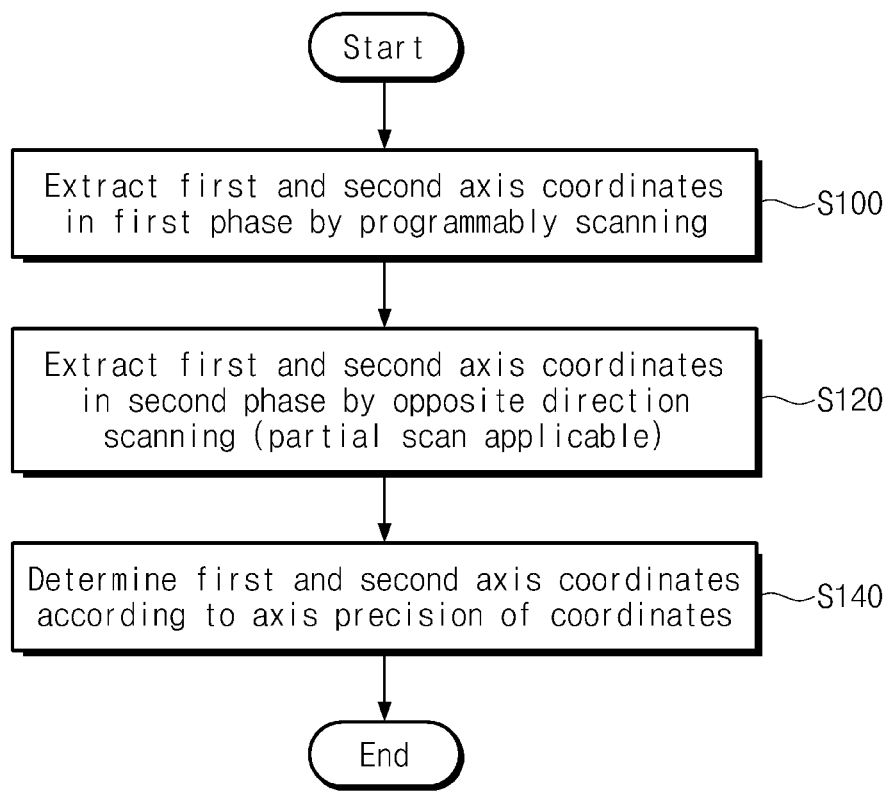
FIG. 3 is a coordinate extraction control flow chart in accordance with FIG. 2 according to an exemplary embodiment of the present general inventive concept.

A procedure of a coordinate extraction of the processor 250 is illustrated in FIG. 3.

FIG. 3 is a coordinate extraction control flow chart in accordance with FIG. 2.

Referring to FIG. 3, in operation S100, the processor 250 extracts first and second axis coordinates in a first phase. In this case, the processor 250 controls the driving and sensing unit 230 to send drive signals in the X-axis direction of FIG. 2 and processes sensing signals obtained from the Y-axis direction of FIG. 2 according to the weighted mean extraction algorithm to calculate the first and second axis coordinates of the first frame. In operation S100, the processor 250 can perform a control operation of applying the drive signals to all drivers arranged in the X-axis direction, that is, a full scanning control operation.

In operation S120, the processor 250 extracts first and second axis coordinates in a second phase. In this case, the processor 250 controls the driving and sensing unit 230 to send drive signals in the Y-axis direction of FIG. 2 and processes sensing signals obtained from the X-axis direction of FIG. 2 according to the weighted mean extraction algorithm to calculate the first and second axis coordinates of the second frame. In operation S120, the processor 250 can perform a partial scanning control to the exclusion of a full scanning control to reduce power consumption and shorten processing time.

In operation S140, the processor 250 determines first and second axis coordinates having a relatively high coordinate precision among the first and second axis coordinates of the first and second frames as a touch coordinate of the touch panel. In the first phase operation, an X-axis coordinate of the first frame may be taken as the first and second coordinates and in the second phase operation, a Y-axis coordinate of the second frame may be taken as the first and second coordinates.

Figure 4:
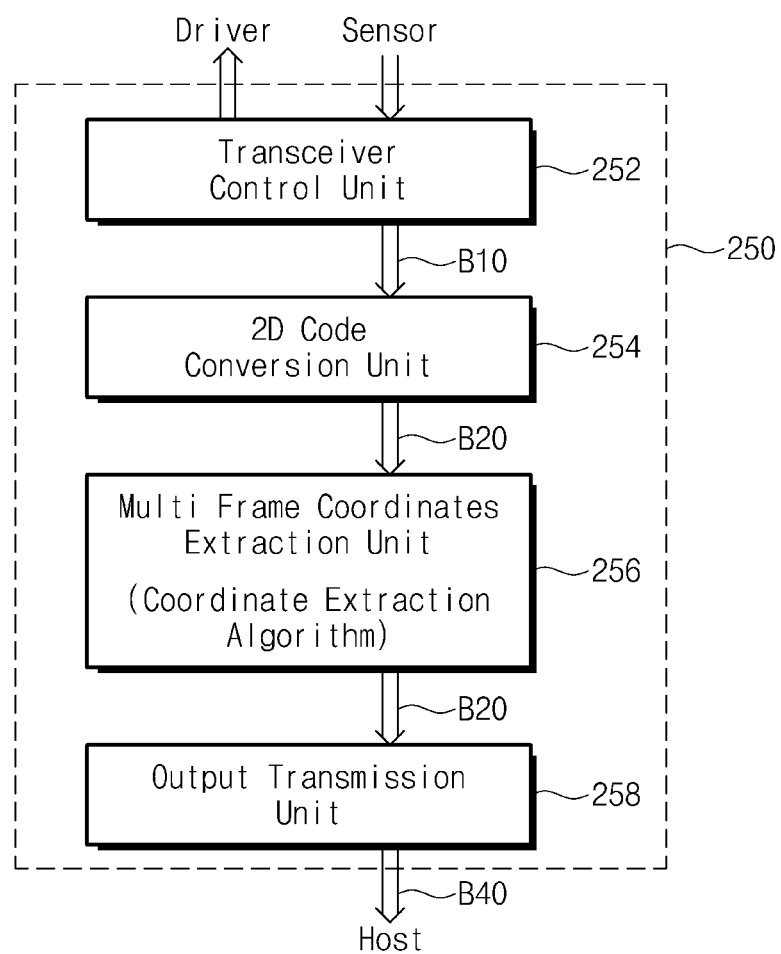
FIG. 4 is a functional circuit block diagram of a processor of FIG. 2 according to an exemplary embodiment of the present general inventive concept.

FIG. 4 illustrates a functional circuit block diagram of a processor of FIG. 2.

Referring to FIG. 4, the processor 250 may include a transceiver control unit 252, a two-dimensional (2D) code conversion unit 254, a multi-frame coordinate extraction unit 256 and an output transmission unit 258.

The transceiver control unit 252, when activating the first group drivers in the first transceiver 210 and the second group sensors in the second transceiver 220, controls the driving and sensing unit 230 so that the second group drivers in the second transceiver 220 and the first group sensors in the first transceiver 210 are inactivated.

The 2D code conversion unit 254 converts the sensing signals into 2D codes. In the case that the sensing signals are given as voltage levels, the 2D code conversion unit 254 can perform an analog-to-digital conversion.

The multi-frame coordinate extraction unit 256 calculates the 2D codes according to a previously set coordinate extraction algorithm to obtain first and second coordinates of the first and second frames, and then extracts a touch coordinate of the touch panel in the order in which a coordinate precision is high. The previously set coordinate extraction algorithm may be stored in a memory 255 (FIG. 2) in a nonvolatile state.

The output transmission unit 258 outputs a touch coordinate of the touch panel extracted from the multi-frame coordinate extraction unit 256 as sensing coordinate data. The output transmission unit 258 may include a parallel-serial converter to transmit the sensing coordinate data through a serial data communication.

Figure 5:
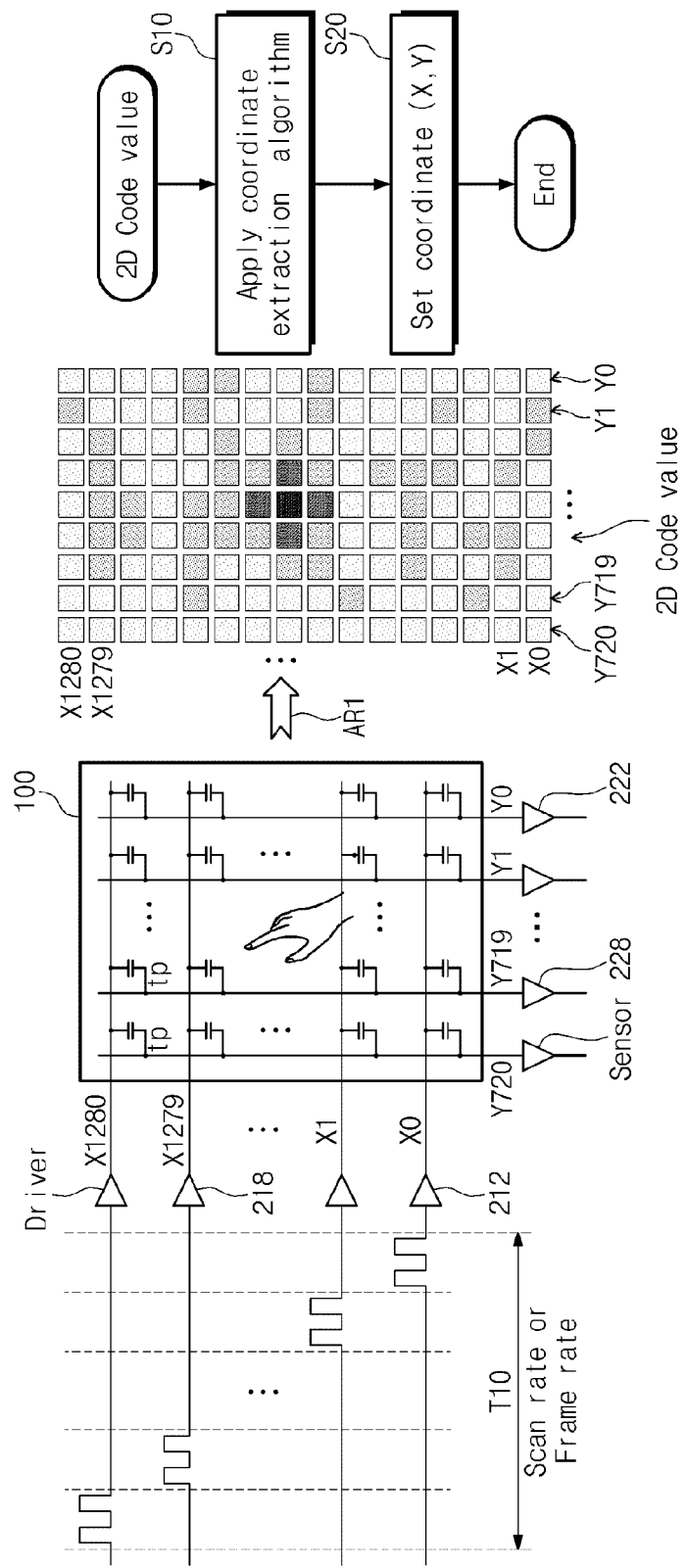
FIG. 5 is a drawing illustrating a general two-dimensional coordinate extraction operation principle.

FIG. 5 is a drawing illustrating a general two-dimensional coordinate extraction operation principle.

Referring to FIG. 5, an illustration of a simple and general capacitive touch system is shown.

A plurality of touch patterns (tp) constituting touch cells or touch pixels are formed in the touch panel 100. A touch pattern may cause a change of mutual capacitance when a conducting object, for example, a user's fingertip, is placed in close proximity to the touch pattern. A proximal touch event that occurs close enough to cause a change in mutual capacitance may be referred to as a touch operation. In some embodiments of the present generation inventive concept actual physical touch is not required in order to trigger a touch operation, but instead only placing the object within sufficient proximity to the touch panel 100 to cause a change in mutual capacitance.

A plurality of drivers 212~218 may be disposed in an X-axis direction and a plurality of sensors 222~228 may be disposed in a Y-axis direction based on the touch panel 100.

The drivers 212~218 drive a row line of the touch patterns arranged in the X-axis direction in response to drive signals being time-divisionally applied.

A time section T10 during which the drive signals are applied determines a scanning or frame rate.

The sensors 222~228 sense mutual capacitance being applied through corresponding column lines to generate a sensing signal.

If a touch operation occurs, for example, when a user's finger touches the touch panel 100, a capacitance of a touch pattern adjacent to the finger is reduced. This causes a change in the 2D code value as indicated along an arrow mark AR1. A center point of an area in which a code value is changed may be used to determine the X, Y coordinate of the touch operation.

In operation S10 of FIG. 5, the 2D code value is processed according to a coordinate extraction algorithm. In operation S20 of FIG. 5, the X, Y coordinate obtained by an execution of operation S10 is set as a touch sensing coordinate.

In an ideal panel, if a touch operation, for example, by fingers, a lens, a touch device, etc., occurs and an inflow of a noise does not exist, the X, Y coordinate of the touch operation can be extracted as the only value.

However, since a considerable quantity of noises flow in a touch system in real situations, capacitance at various touch pattern X, Y coordinates may change or vary even if a touch operation does not occur. Therefore, an index of coordinate precision may be used as an index representing how effectively system noise is removed or avoided. Since a coordinate extraction algorithm is calculated based on the amount of code variations, it is important to reduce code variations due to noise in order to increase a coordinate precision.

Figure 6:
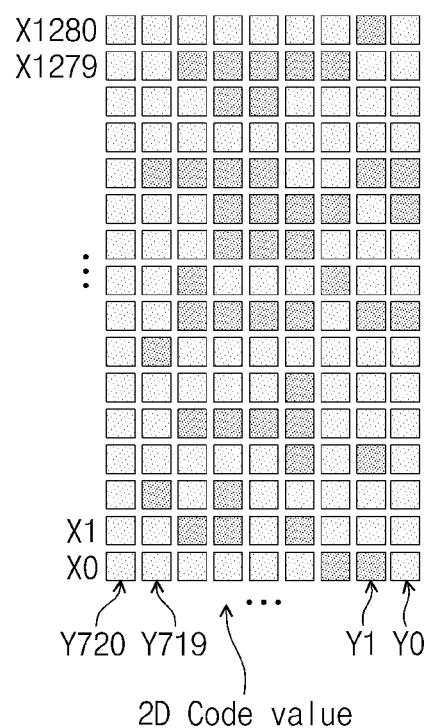
FIG. 6 is a drawing illustrating a two-dimensional code value represented by a noise effect in accordance with FIG. 5.

FIG. 6 is an illustrative drawing of a two-dimensional code value represented by a noise effect in accordance with FIG. 5.

Referring to FIG. 6, an illustration of 2D code value similar to that shown in FIG. 5 is illustrated. A distribution of 2D code value is illustrated showing a state in which a touch operation does not occur and only a noise flows in the touch system.

Figure 7:
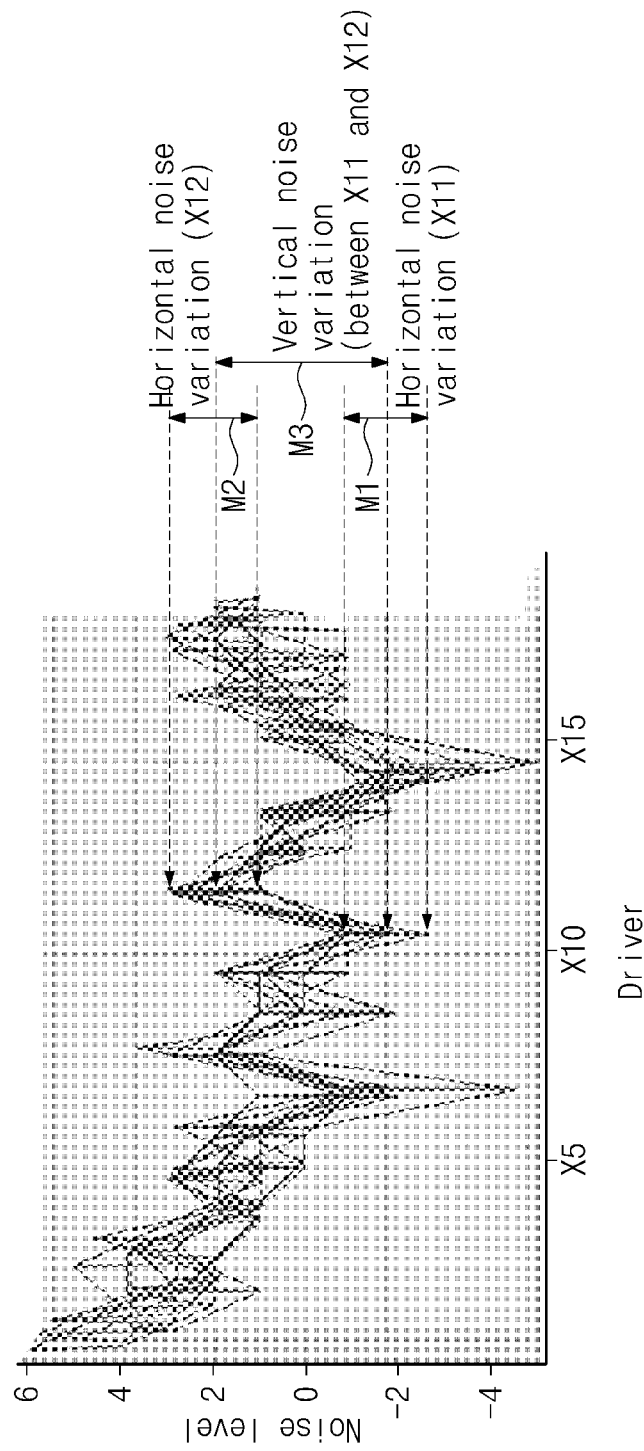
FIG. 7 is a drawing illustrating a noise distribution wire frame in accordance with FIG. 6.

FIG. 7 is an illustrative drawing of a noise distribution wire frame in accordance with FIG. 6.

Referring to FIG. 7, a distribution of a noise code value of FIG. 6 is represented by a wire frame. A horizontal axis represents X lines of drivers and a vertical axis represents a noise level.

As shown in FIG. 7, a noise can be divided into two components of a horizontal axis and a vertical axis (an X-axis and a Y-axis). Here, a noise magnitude of a vertical axis (the Y-axis) may be greater than that of a horizontal axis (the X-axis). In FIG. 7, M1 indicates a size of a horizontal noise variation of a driver X11. M2 indicates a size of a horizontal noise variation of a driver X12. M3 indicates a size of a vertical noise variation between the drivers X11 and X12 disposed adjacent to each other being time-divisionally driven. A noise level of a Y-direction represented by the drivers X11 and X12 is greater than a noise level of an X-direction represented by the drivers X11 and X12.

Figure 8:
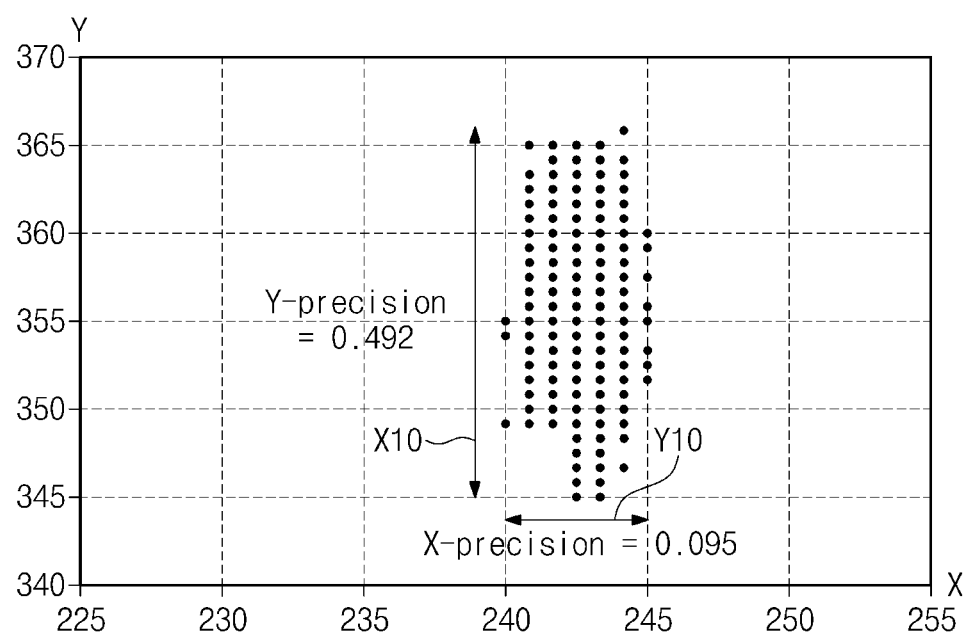
FIG. 8 is a drawing illustrating a coordinate cumulative distribution represented by a noise effect when performing a touch operation according to FIG. 5.

FIG. 8 illustrates a coordinate cumulative distribution represented by a noise effect when performing a touch operation according to FIG. 5.

In FIG. 8, a touch occurs at a fixed location. Along with system noise, the touch causes a change in capacitance at a distribution of coordinates. A coordinate precision of the touch location in each axis can be determined through the coordinate cumulative distribution. A horizontal axis of FIG. 8 indicates a location value on an X-axis coordinate of the touch panel. A vertical axis indicates a location value on a Y-axis coordinate. FIG. 8 illustrates an exemplary case in which a touch occurs around a 240-250 X-axis location when an X-axis coordinate value range of the touch panel is 0-1280.

In FIG. 8, a change of a Y-axis coordinate is greater than a change of an X-axis coordinate. That is, a precision of a Y-axis coordinate (Y-precision) is considerably lower than a precision of an X-axis coordinate (X-precision). Since, as indicated by line Y10, a precision of an X-axis coordinate is 0.095 and as indicated by line X10, a precision of a Y-axis coordinate is 0.492, a precision of the X-axis coordinate is superior to a precision of the Y-axis coordinate.

The reason that a noise component of the Y-axis direction is great is that a drive line is time-divisionally scanned. Since the capacitive touch system has to sense a small amount of changes in capacitance, it may utilize a sensor having a high sensitivity. The touch panel sensitively may respond to, for example, a light source including a fluorescent light and external noises like a power noise. Since external noises may change every moment, a noise difference between lines (Y-axis) becomes relatively great in a structure time-divisionally scanning a line. This has an influence on a decrease in precision of Y-axis coordinate.

To improve a coordinate precision, in the embodiments of the present general inventive concept, the first and second transceiver 210 and 220 are included and the processor of FIG. 2 controls operations of first and second phases.

Figure 9:
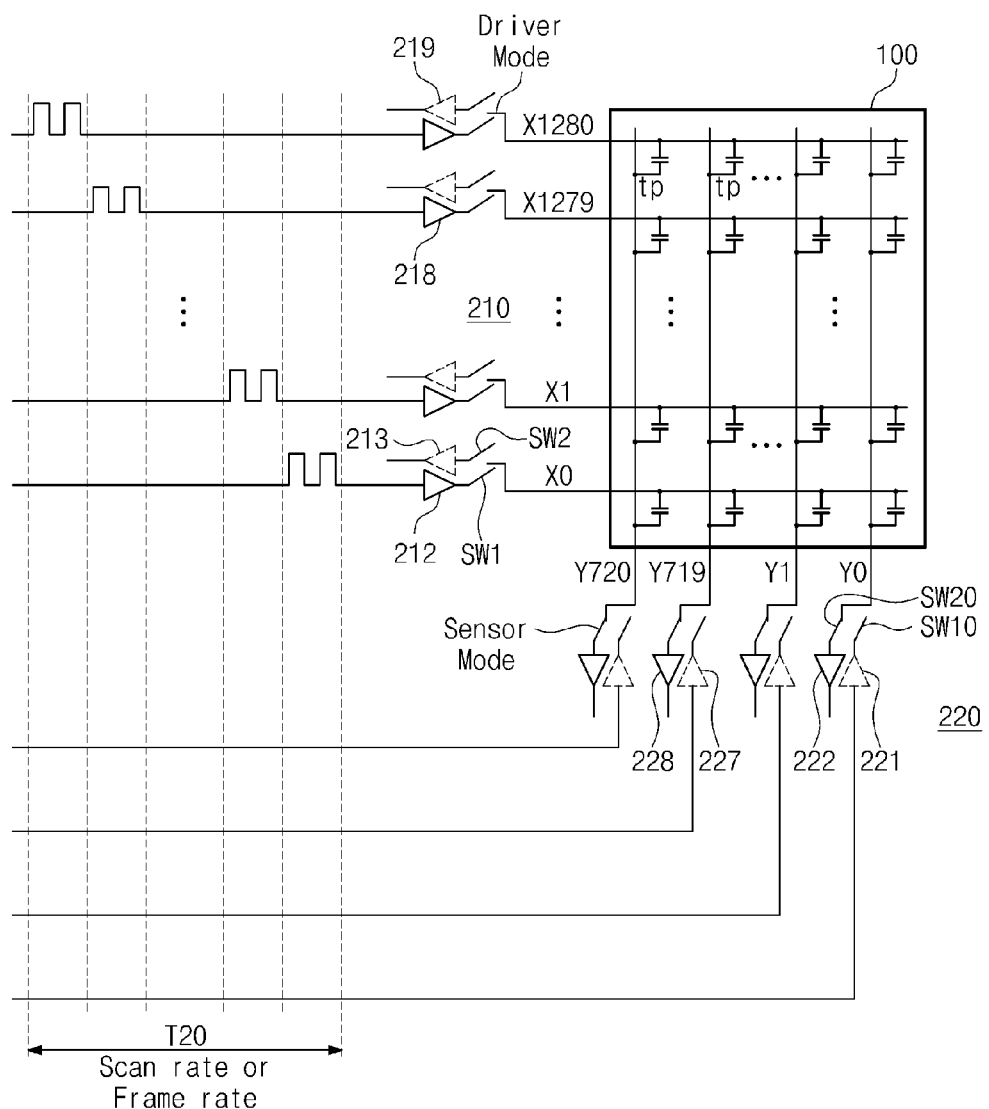
FIG. 9 is a drawing illustrating a coordinate extraction operation in a first phase in accordance with FIG. 3 according to an exemplary embodiment of the present general inventive concept.
Figure 10:
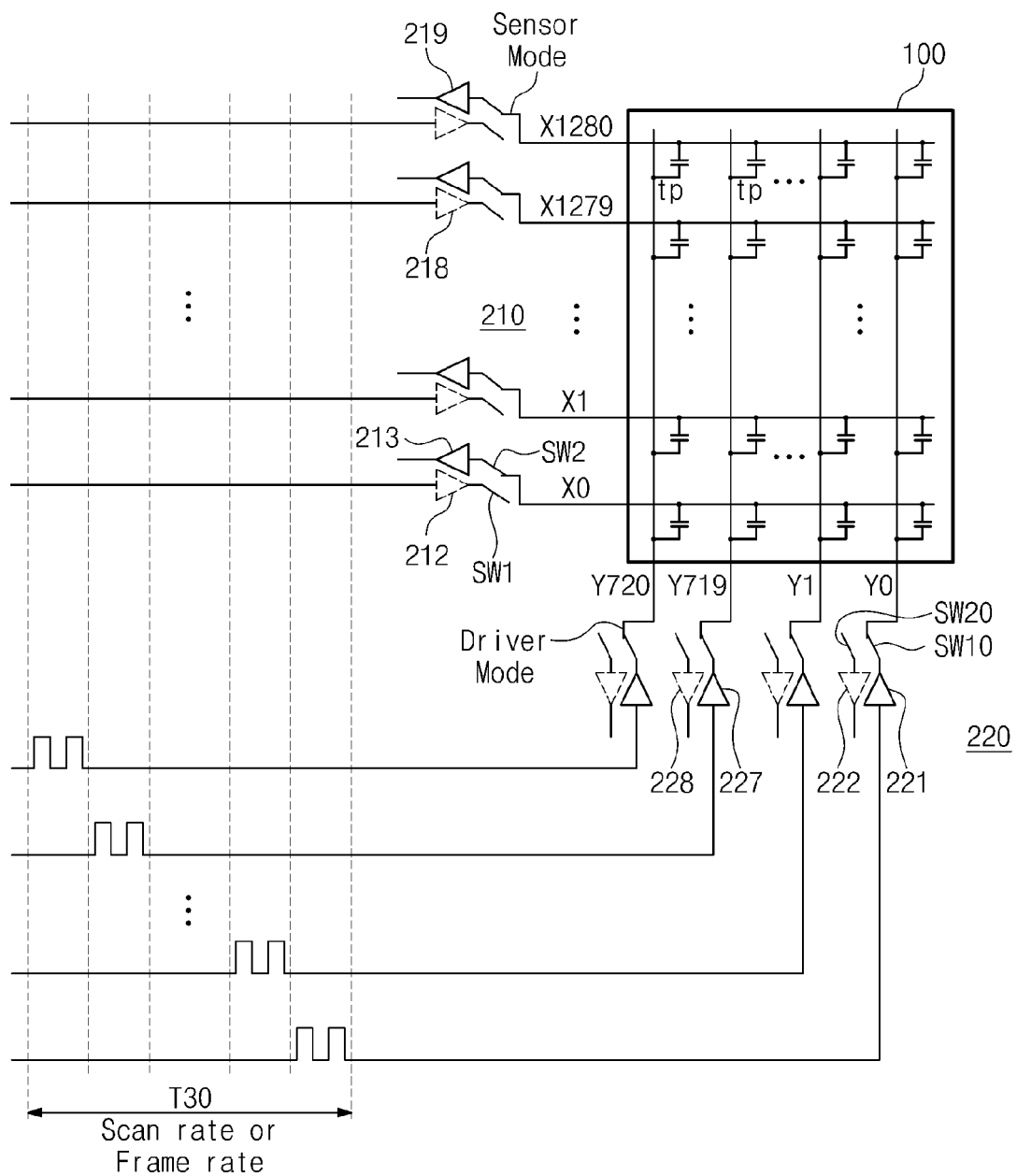
FIG. 10 is a drawing illustrating a coordinate extraction operation in a second phase in accordance with FIG. 3 according to an exemplary embodiment of the present general inventive concept.

For convenience of description, in accordance with FIG. 3, FIG. 9 illustrates a coordinate extraction operation in a first phase operation and FIG. 10 illustrates a coordinate extraction operation in a second phase operation.

Referring to FIG. 9, a plurality of first group drivers 212 and 218 and a plurality of first group sensors 213 and 219 are disposed in an X-axis direction based on the touch panel 100. The first group drivers 212 and 218 and the first group sensors 213 and 219 are included in the first transceiver 210. A switching operation of the first group drivers 212 and 218 is controlled by a selection switch SW1. A switching operation of the first group sensors 213 and 219 is controlled by a selection switch SW2.

A plurality of second group drivers 221 and 227 and a plurality of second group sensors 222 and 228 are disposed in a Y-axis direction based on the touch panel 100. The second group drivers 221 and 227 and the second group sensors 222 and 228 are included in the second transceiver 220. A switching operation of the second group drivers 221 and 227 is controlled by a selection switch SW10. A switching operation of the second group sensors 222 and 228 is controlled by a selection switch SW20.

A time section T20 to which the drive signals are applied determines a scanning or frame rate of the first phase.

The drive signals may be applied in the X-axis direction during the first phase. The drive signals may be time-divisionally applied. The drive signals may have several tens or several hundreds of kilohertz. The drive signals may be applied by combining two frequencies set.

To apply the drive signals to scanning lines in the first phase, the first group drivers 212 and 218 are activated by a selection switching operation of the selection switch SW1. To obtain sensing signals of the first frame in the first phase, the second group sensors 222 and 228 are activated by a selection switching operation of the selection switch SW20.

In the first phase, the first group sensors 213 and 219 and the second group drivers 221 and 227 are inactivated.

Referring to FIG. 10, on the contrary, during the second phase drive signals are applied in a Y-direction.

A time section T30 to which the drive signals are applied in a Y-axis direction determines a scanning or frame rate of the second phase.

The drive signals may be time-divisionally applied during the time section T30.

To apply the drive signals to scanning lines in the second phase, the second group drivers 221 and 227 are activated by a selection switching operation of the selection switch SW10. To obtain sensing signals of the first frame in the second phase, the first group sensors 213 and 219 are activated by a selection switching operation of the selection switch SW2.

In the second phase, the first group drivers 212 and 218 and the second group sensors 222 and 228 are inactivated.

In exemplary embodiments of the present general inventive concept, drivers, sensors and selection switches are set as each transceiver in the X and Y directions, and the drivers and the sensors can be programmably driven to improve coordinate precision.

To reduce a noise difference between adjacent sensors, one of two frames drives a driver in a horizontal axis (X-axis) to obtain sensing signals and the other frame drives a driver in a vertical axis (Y-axis) to obtain sensing signals.

Figure 11:
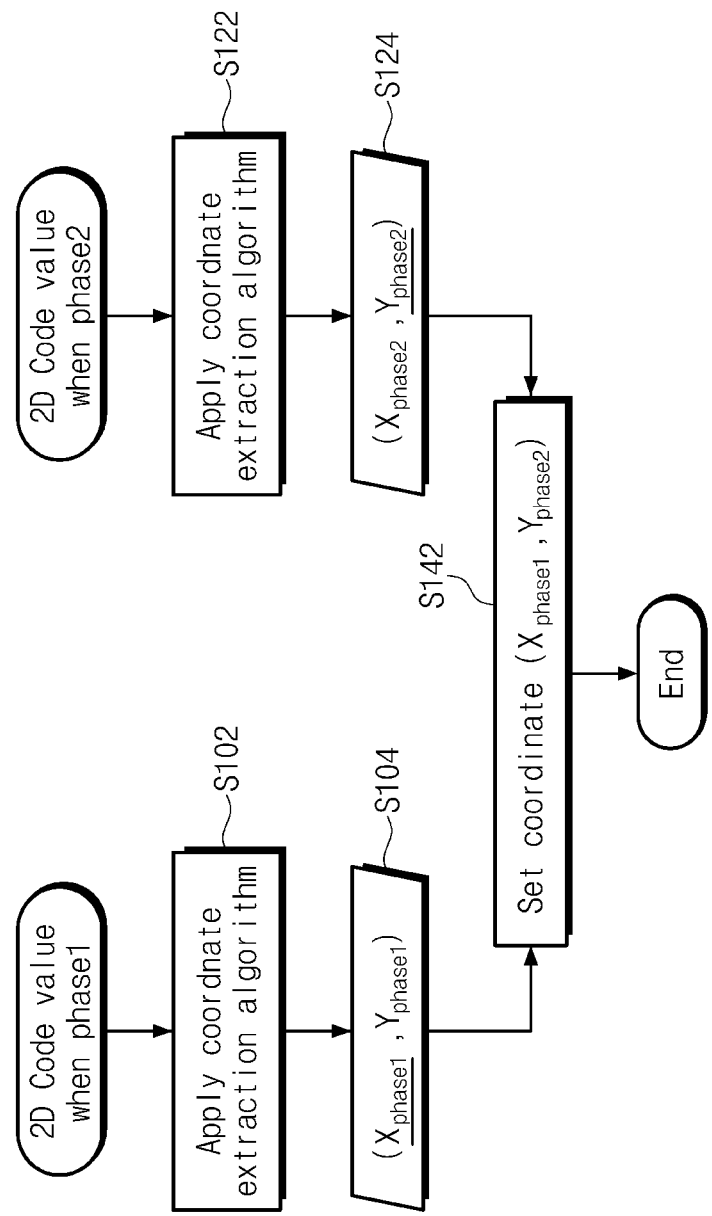
FIG. 11 is a flow chart of a coordinate extraction operation relative to FIGS. 9 and 10 according to an exemplary embodiment of the present general inventive concept.
Figure 12:
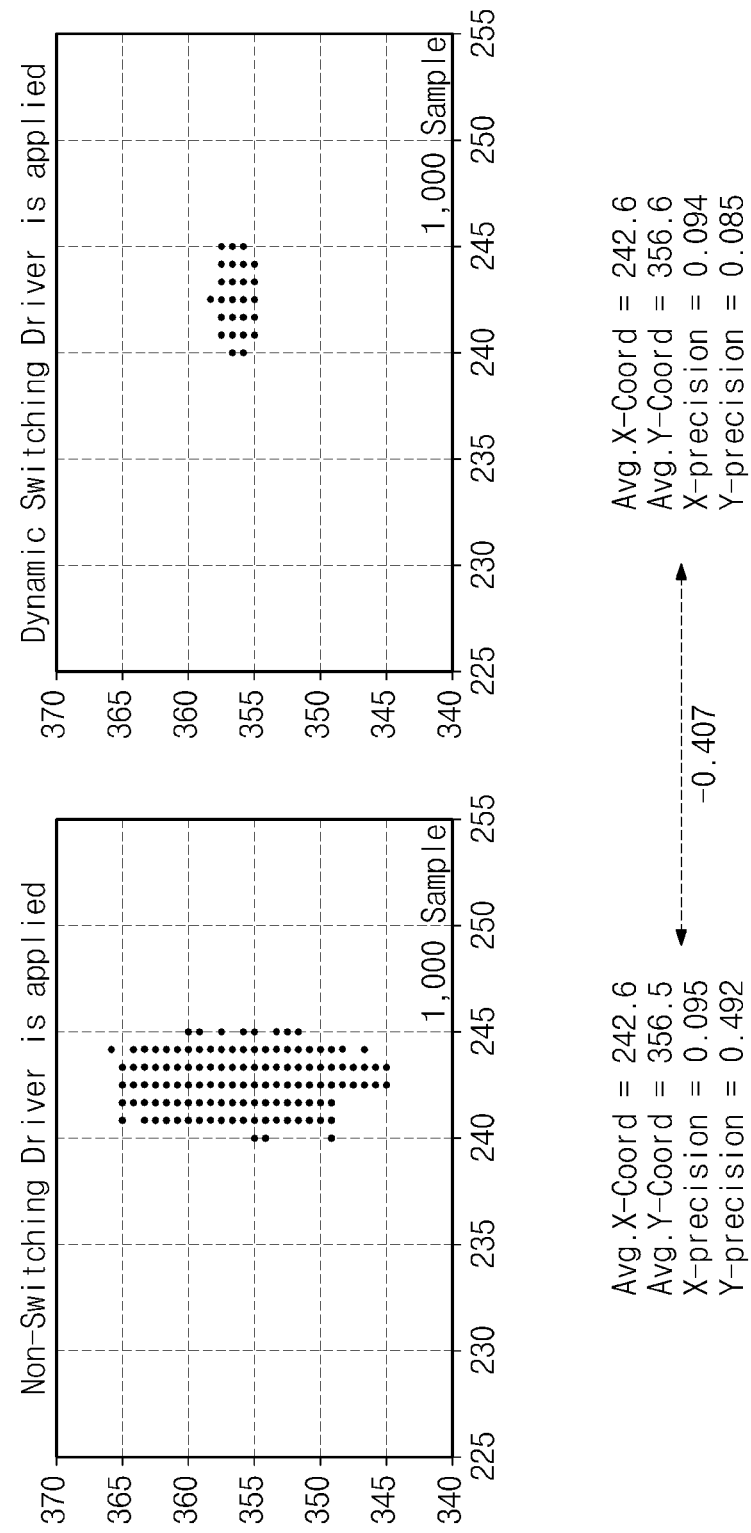
FIG. 12 is a drawing illustrating a coordinate precision improvement effect represented by a result of the coordinate extraction operation of FIG. 11 according to an exemplary embodiment of the present general inventive concept.

Respective 2D codes of the two frames have a small noise deviation in a different axis from each other. As illustrated in FIG. 11, by extracting coordinates in the second frame respectively to select a coordinate having a higher coordinate precision than the corresponding coordinate precision of the first frame, a resulting final coordinate precision is increased. Using this principal, a simulation result showing that a precision of a Y-axis coordinate is greatly improved as compared with the basic precision is illustrated in FIG. 12.

FIG. 11 is a flow chart of a coordinate extraction operation relative to FIGS. 9 and 10.

Referring to FIG. 11, in operation S102, a coordinate extraction algorithm is applied to sensing signals of the first frame obtained through a drive and sensing operation of the first phase as shown in FIG. 9. In operation S104, first and second axis coordinates of the first frame are generated according to the coordinate extraction algorithm.

In operation S122, a coordinate extraction algorithm is applied to sensing signals of the second frame obtained through a drive and sensing operation of the second phase as shown in FIG. 10. In operation S124, first and second coordinates axis of the second frame are generated according to the coordinate extraction algorithm.

In operation S142, first and second axis coordinates having a relatively high coordinate precision among the first and second axis of the first and second frames are selectively set as a touch coordinate of the touch panel. In operation S142, an X-axis coordinate obtained from the first frame of the first phase and a Y-axis coordinate obtained from the second frame of the second phase are determined as the touch coordinate of the touch panel. A precision of the Y-axis coordinate obtained from the second frame of the second phase is higher than a precision of the X-axis coordinate obtained from the first frame of the first phase. This is based on the description of FIG. 8.

The drive and sensing operation in the first and second frames may be programmably changed by the processor.

FIG. 12 illustrates a coordinate precision improvement effect represented by a result of the coordinate extraction operation of FIG. 11.

Referring to FIG. 12, a left drawing illustrates a simulation result in accordance with FIG. 5 and a right drawing illustrates a simulation result to which a second phase extraction scheme is applied. In the drawing, the item and unit of the horizontal axis and the vertical axis are the same as those of FIG. 8. The number of samples applied to FIG. 12 is 1000.

The result shown in FIG. 12 confirm that a touch panel has a high sensing precision and is stronger against noise in a coordinate extraction operation in accordance with exemplary embodiments of the present general inventive concept.

When extracting a 2-dimensional coordinate by fully scanning two frames as shown in FIG. 11, a coordinate extraction time, i.e., a report rate, may be double as compared with FIG. 5. Therefore, since the two frames are all fully scanned and first and second axis coordinates having a relatively high coordinate precision are determined as a final output coordinate, a touch reaction velocity may be slow.

Figure 13:
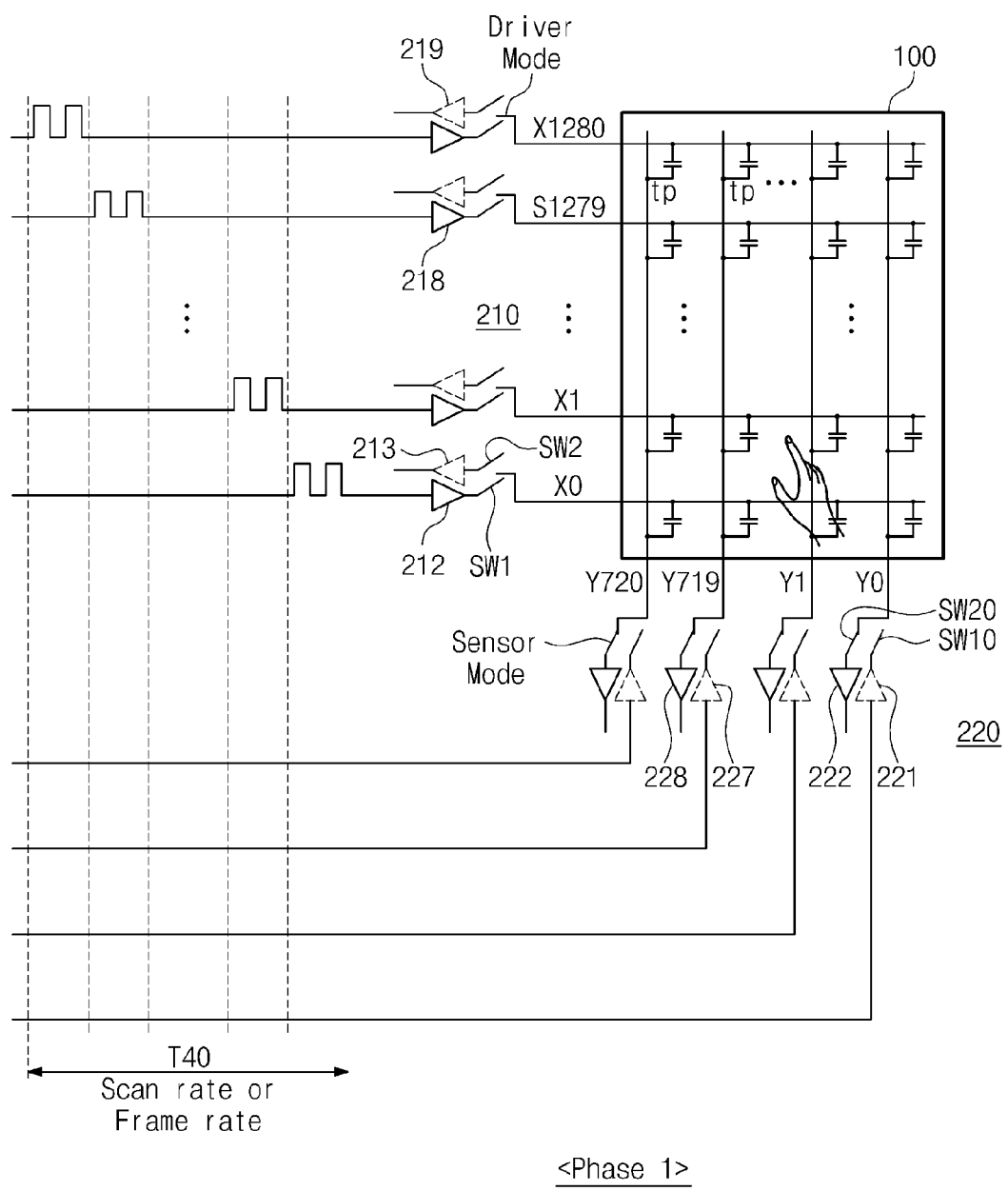
FIG. 13 is a drawing illustrating a coordinate extraction operation of a full scan method in a first phase in accordance with FIG. 3 according to an exemplary embodiment of the present general inventive concept.
Figure 14:
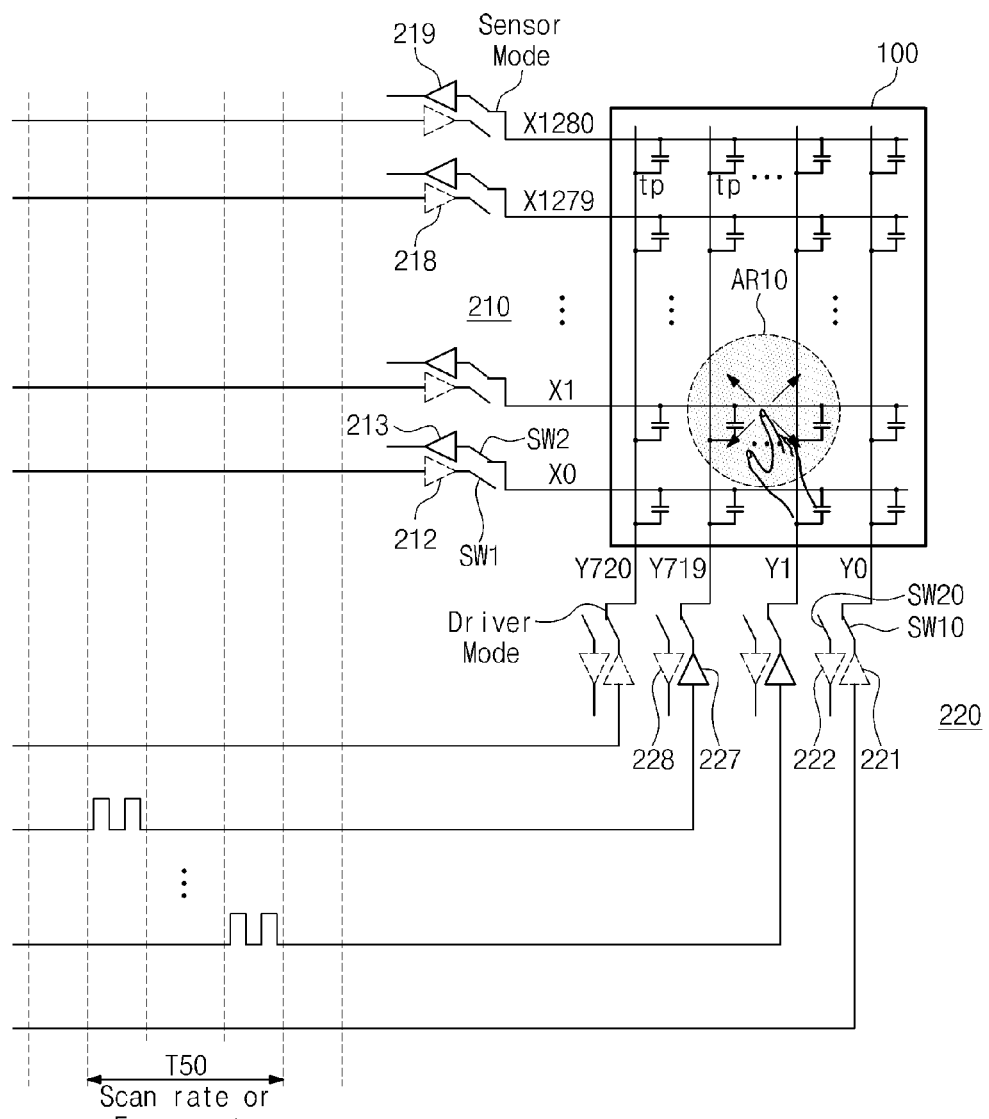
FIG. 14 is a drawing illustrating a coordinate extraction operation of a partial scan method in a second phase in accordance with FIG. 3 according to an exemplary embodiment of the present general inventive concept.

The touch system controller 200 can decrease the amount that a touch reaction velocity is reduced by operating such that a full scan operation is executed in the first phase as shown in FIG. 13 and a partial scan operation is executed in the second phase as shown in FIG. 14.

A partial scan operation is based on a locality of reference. When a recent prior touch coordinate is known, a current coordinate can be obtained by partially scanning only an area that is considered to be within a range of the prior touch. Since the number of drive signals used in a partial scan operation is less than the number of drive signals used in a full scan operation, the time it takes to execute a partial scan operation may be shortened to that extent.

Referring to FIG. 13, to sense a finger touch, an exemplary coordinate extraction operation of a full scan operation of the first phase is shown.

The operation in FIG. 13 is the same as the operation of extracting X, Y-axis coordinates of the first frame in the first phase of FIG. 9. A scanning or frame rate of the first phase is represented by a time section T40.

Referring to FIG. 14, first and second axis coordinates of the second frame are obtained by executing a partial scan operation in the second phase.

In FIG. 14, a scanning or frame rate of the second phase is represented by a time section T50. Since the time section T50 is significantly short as compared with the time section T30 of FIG. 10, a touch reaction velocity is improved.

In the second phase, the drive signals are provided in nearby pattern area AR10 surrounding a touch pattern corresponding to the first and second axis coordinates of the first frame along a Y-axis direction. In the second phase, first and second axis coordinates of the second frame are obtained by sensing mutual capacitance of the nearby pattern area AR10 along an X-axis direction.

The processor 250 of FIG. 2 determines first and second axis coordinates having a relatively high coordinate precision among the first and second axis coordinates of the first and second frames as a touch coordinate of the touch panel.

The nearby pattern area AR10 of FIG. 14 represents a range, for example, a movable distance range of fingers with the coordinate extracted from the first phase as the center. A range of the nearby pattern area AR10 may be variously increased or decreased, for example, according to the number of touches or the touch velocity. As described above, the partial scan operation being performed in the second phase reduces power consumption as compared with the full scan operation.

Figure 15:
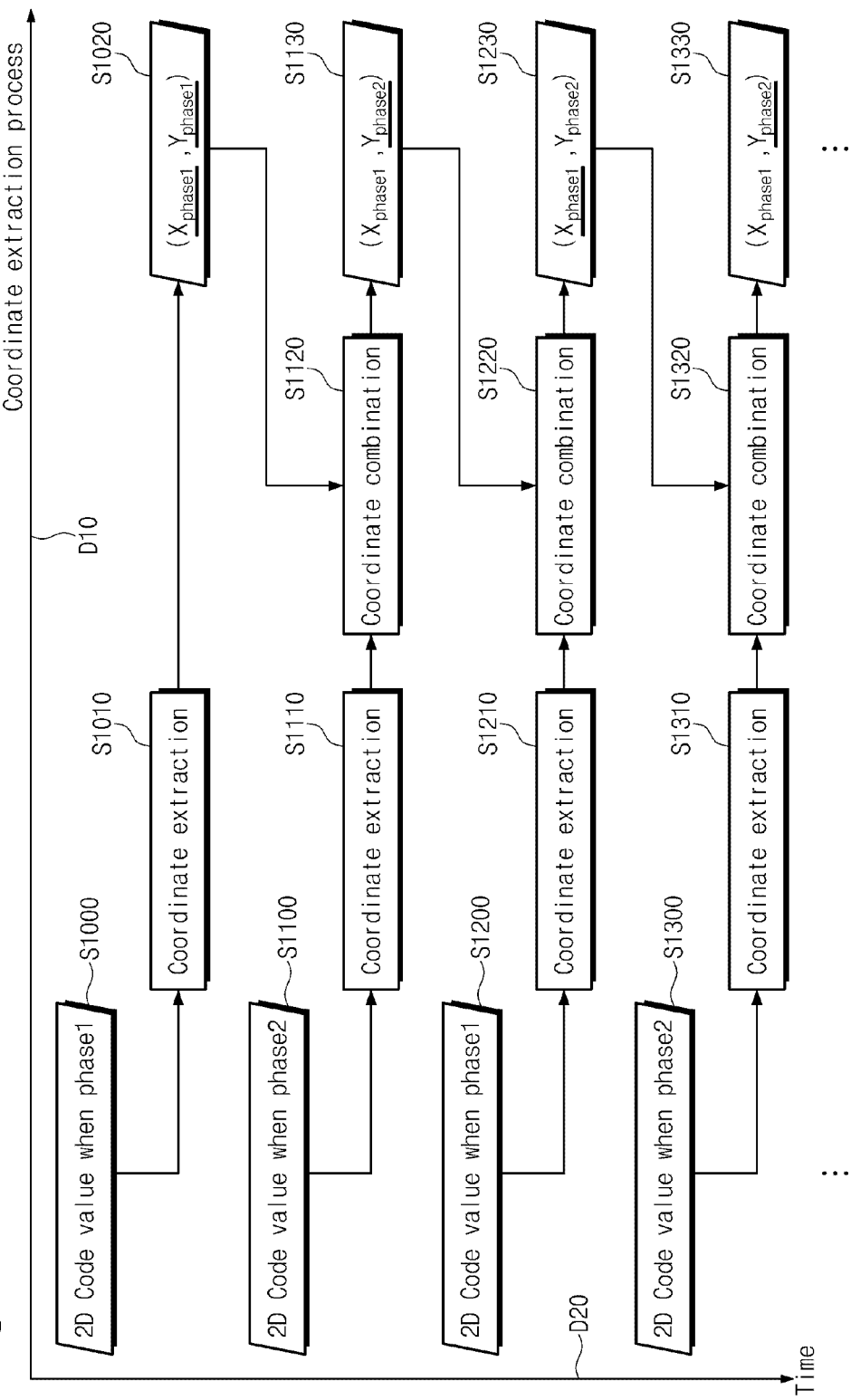
FIG. 15 is a flow chart of a coordinate extraction operation relative to a multi touch according to an exemplary embodiment of the present general inventive concept.

FIG. 15 is a flow chart of a coordinate extraction operation relative to a multi-touch in accordance with an exemplary embodiment of the present general inventive concept.

The partial scan function is vulnerable to generation of multi-touch. That is, in the case that a scan area is wide, the partial scan function needs to be complemented.

To counter the vulnerability of generating a multi-touch, a coordinate combination algorithm as illustrated in FIG. 15 may be applied.

A basic concept of the coordinate combination algorithm illustrated in FIG. 15 is based on the fact that a scanning velocity is faster than a moving speed of fingers. Based on this concept, the coordinate extracted from the previous frame may be recycled in a current frame.

In the first operation of the first phase, X, Y coordinates are extracted from 2D code. In phases after the first operation of the first phase, a coordinate having a higher coordinate precision between the previous coordinate and the current coordinate is reported as a final coordinate. This algorithm has the same performance as the method of extracting an X, Y coordinate by one frame.

A horizontal direction D10 indicates a proceeding direction of a coordinate extraction process.

A vertical direction D20 indicates an increasing direction of time.

In the embodiment shown in FIG. 15, the previous coordinate is reused in the current coordinate in order to distinguish an arbitrary touch when a multi-touch operation is performed.

In operation S1000, an operation in the first phase begins. In the operation in the first phase, drive signals are applied in an X-axis direction.

A coordinate extraction operation is executed in operation S1010 subsequent to operation S1000. First and second axis coordinates, that is, X, Y-axis coordinates ($X_{phase1}$, $Y_{phase1}$) are obtained in operation S1020. That is, X, Y coordinates are all extracted from 2D code in the first phase.

In operation S1100, an operation in the second phase subsequent to the operation in the first phase begins. In the operation in the second phase, drive signals are applied in a Y-axis direction. A coordinate extraction operation is then executed in operation S1110. Next, a coordinate combination operation utilizing an X-axis coordinate ($X_{phase1}$) of the previous frame obtained in operation S1020 as a coordinate of the current frame is performed in operation S1120. After that, X, Y-axis coordinates ($X_{phase1}$, $Y_{phase2}$) are obtained in operation S1130. The Y-axis coordinate ($Y_{phase2}$) is a new Y-axis coordinate from the second frame different from the Y-axis coordinate ($Y_{phase1}$) in the first frame. The X-axis coordinate ($X_{phase1}$) in the second frame is a coordinate such that the X-axis coordinate ($X_{phase1}$) from the first frame is recycled.

The Y-axis coordinate ($Y_{phase2}$) among the X, Y-axis coordinates ($X_{phase1}$, $Y_{phase2}$) obtained in operation S1130 is recycled in a next frame. Accordingly, after beginning a subsequent first phase operation in operation S1200 and extracting coordinates in operation S1210, a recycled Y-axis coordinate is combined with the new X-axis coordinate in operation S1220. In other words, the Y-axis coordinate ($Y_{phase2}$) shown in operation S1230 is the Y-axis coordinate ($Y_{phase2}$) obtained in operation S1130. The X-axis coordinate $X_{phase1}$ shown in operation S1230 is a new X-axis coordinate extracted in operation S1210. The process may continue in a subsequent second phase operation in operation S1300, further extracting coordinates in operation S1310, and combining present Y-axis coordinate ($Y_{phase2}$) with the X-axis coordinate ($X_{phase1}$) from the previous first phrase operation in operation S1320. The resulting coordinates in operation S1330 may be outputted as touch coordinates or another cycle of first/second phase operations may be executed as described above in order to increase the coordinate precision of the final touch coordinates.

In case of multi-touch sensing, when first and second axis coordinates having a relatively high coordinate precision among the first and second axis coordinates of the first and second frames are determined as a touch coordinate of the touch panel, one of the first and second axis coordinates of the first frame is determined as a touch coordinate of the touch panel to utilize a coordinate of a previous frame when a multi-touch is generated.

As described above, in exemplary embodiments of the present general inventive concept, first and second transceivers may be programmably controlled to reduce a noise deviation between adjacent sensors. A change of axis of the driver and sensor is flexibly performed in a direction that lowers a noise deviation between adjacent touch patterns and thereby increases coordinate precision. An effective resource use and a fast reaction velocity are realized by using only a part of the drivers and sensors according to touch conditions.

In a capacitive touch system according to exemplary embodiments of the present general inventive concept, a processor can reduce a sampling rate and a decimation rate when a number of touches is reduced during a time previously set and can increase a sampling rate and a decimation rate when the number of touches is increased during the time previously set. If there is no change in the number of touches, a sampling rate and decimation rate can be maintained at current levels.

Figure 16:
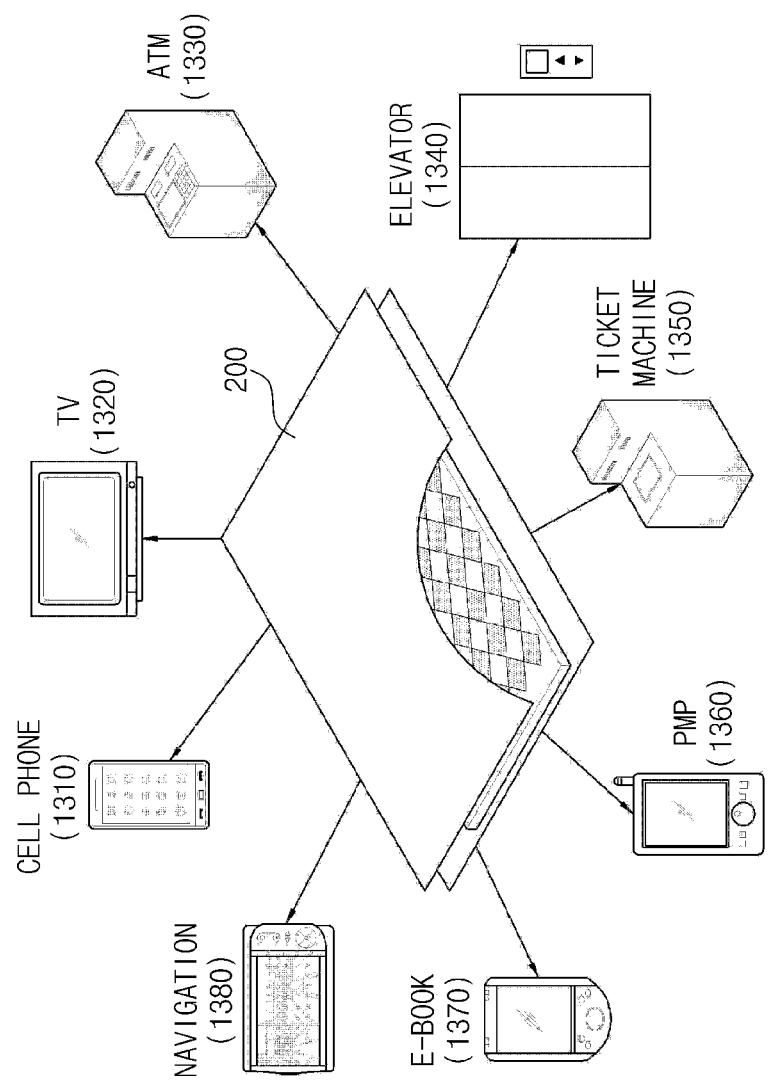
FIG. 16 is a block diagram illustrating application examples of the present general inventive concept applied to various display devices.

FIG. 16 is a block diagram illustrating application examples of the inventive concept applied to various display devices.

Referring to FIG. 16, the capacitive touch system 5 illustrated in FIG. 1 can be adopted in not only a cellular phone 1310 but also a LCD or PDP TV 1320, an ATM 1330 automatically deputizing a cash handling of a bank, elevator 1340, a ticket machine 1350, a PMP 1360, an e-book reader 1370 and a navigation 1380. The capacitive touch system can be loaded in every field that needs a user interface in the form of a touch panel or screen. In case of a cellular phone, adoption of such a touch panel may be very effective.

The capacitive touch system 5 can generate a touch coordinate which is strong against noise and has a high touch precision according to exemplary embodiments of the present general inventive concept. Since a touch coordinate is rapidly generated while reducing power consumption, a reaction velocity of a touch response may increase.

Since a controller of a display device connected to the capacitive touch system 5 can receive touch sensing coordinate data without a separate control line, it can perform a proper control or a processing operation.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A coordinate extraction method in a capacitive touch system comprising:
    obtaining first and second axis coordinates of a first frame by providing drive signals for changing mutual capacitances of touch patterns formed on a touch panel when a touch occurs on the touch panel in a first direction selected in a first phase and sensing mutual capacitances of the touch patterns in a second direction different from the first direction;
    obtaining first and second axis coordinates of a second frame by providing drive signals in the second direction in a second phase and sensing mutual capacitances of the touch patterns in the first direction; and
    selecting first and second axis coordinates having a coordinate precision relatively higher than that of another coordinate among the first and second axis coordinates of the first and second frames as a touch coordinate of the touch panel.

2. The coordinate extraction method of claim 1, wherein when the first direction is an X-axis direction on the basis of the touch panel, the second direction is a Y-axis direction.

3. The coordinate extraction method of claim 1, wherein when the touch panel has a rectangular shape, the number of the drive signals being provided from the first phase is different from the number of the drive signals being provided from the second phase.

4. The coordinate extraction method of claim 1, wherein when the touch panel has a square shape, the number of the drive signals being provided from the first phase is the same as the number of the drive signals being provided from the second phase.

5. The coordinate extraction method of claim 1, wherein the first and second axis coordinates of the first and second frames are obtained by a coordinate extraction algorithm.

6. The coordinate extraction method of claim 5, wherein the coordinate extraction algorithm is executed by an exclusive processor or a CPU.

7. The coordinate extraction method of claim 1, further comprising sensing a touch location at touch patterns constituted by upper and lower pattern layers forming touch cells or touch pixels so that variations of the mutual capacitances are sensed at the touch location.

8. A coordinate extraction method of a capacitive touch system comprising:
    obtaining first and second axis coordinates of a first frame by providing drive signals for changing mutual capacitances of touch patterns formed on a touch panel when a touch occurs on the touch panel in a first direction selected in a first phase in a full-scan method and sensing mutual capacitances of the touch patterns in a second direction different from the first direction;
    obtaining first and second axis coordinates of a second frame by providing drive signals in a nearby pattern area surrounding a touch pattern corresponding to the first and second axis coordinates of the first frame along a second direction in a second phase in a partial-scan method and sensing mutual capacitances of the nearby pattern area in the first direction; and
    selecting first and second axis coordinates having a coordinate precision relatively higher than that of another coordinate among the first and second axis coordinates of the first and second frames as a touch coordinate of the touch panel.

9. The coordinate extraction method of claim 8, wherein when the first direction is a Y-axis direction on the basis of the touch panel, the second direction is an X-axis direction crossing the Y-axis at an angle of 15-90 degrees.

10. The coordinate extraction method of claim 8, wherein a scanning time in the second phase by the partial-scan method is set shorter than a scanning time in the first phase.

11. The coordinate extraction method of claim 8, wherein a sensing in the first and second phases is performed based on an improvement of a touch precision, and wherein the partial-scan method with respect to the nearby pattern area is performed based on a locality of reference.

12. The coordinate extraction method of claim 8, wherein the first and second axis coordinates of the first and second frames are obtained by a coordinate extraction algorithm.

13. The coordinate extraction method of claim 12, wherein the coordinate extraction algorithm is executed by an exclusive processor or a digital signal processor.

14. The coordinate extraction method of claim 8, wherein the touch panel is applied to a mobile electronic device.

15. A coordinate extraction method of a capacitive touch system comprising:
 obtaining first and second axis coordinates of a first frame by providing drive signals for changing mutual capacitances of touch patterns formed on a touch panel when a touch occurs on the touch panel in a first direction selected in a first phase in a full-scan method and sensing mutual capacitances of the touch patterns in a second direction different from the first direction;
 obtaining first and second axis coordinates of a second frame by providing drive signals in a nearby pattern area surrounding a touch pattern corresponding to the first and second axis coordinates of the first frame along a second direction in a second phase in a partial-scan method and sensing mutual capacitances of the nearby pattern area in the first direction; and
 selecting one of the first and second axis coordinates of the first frame as a touch coordinate of the touch panel when a multi-touch is generated when determining first and second axis coordinates having a coordinate precision relatively higher than that of another coordinate among the first and second axis coordinates of the first and second frames as a touch coordinate of the touch panel.

16. The coordinate extraction method of claim 15, wherein when the first direction is an X-axis direction on the basis of the touch panel, the second direction is a Y-axis direction crossing the X-axis at right angles.

17. The coordinate extraction method of claim 15, wherein a scanning time in the second phase is shorter than a scanning time in the first phase.

18. The coordinate extraction method of claim 15, wherein the partial-scan method with respect to the nearby pattern area is performed based on a locality of reference.

19. The coordinate extraction method of claim 15, wherein when the first axis coordinate of the first frame is determined as one touch coordinate of the touch panel, the other touch coordinate is determined as the second axis coordinate of the second frame.

20. The coordinate extraction method of claim 19, wherein the other touch coordinate is utilized as one touch coordinate of the touch panel in a next phase of the first phase.

21. The coordinate extraction method of claim 15, wherein the touch panel is disposed on an upper portion in which a display device is formed.

22. A capacitive touch system comprising:
 a touch panel in which touch patterns constituting touch cells or touch pixels are formed;
 a first transceiver which includes a plurality of first group drivers and a plurality of first sensors and is connected to the touch patterns in a first direction on the basis of the touch panel;
 a second transceiver which includes a plurality of second group drivers and a plurality of second sensors and is connected to the touch patterns in a second direction different from the first direction;
 a driving and sensing unit configured to apply driving signals for changing mutual capacitances of the touch patterns to one of the first and second transceivers and to receive sensing signals through the other transceiver; and
 a processor configured to calculate first and second axis coordinates of a first frame using sensing signals obtained in the second direction different from the first direction when controlling the driving signals to be provided in the first direction selected in a first phase, calculate first and second axis coordinates of a second frame using sensing signals obtained in the first direction by controlling the driving signals to be provided in the second direction in a second phase, and determine first and second axis coordinates having a coordinate precision relatively higher than that of another coordinate among the first and second axis coordinates of the first and second frames as a touch coordinate of the touch panel.

23. The capacitive touch system of claim 22, wherein the processor is configured to control the driving and sensing unit so that the driving signals in the first phase are provided in a full-scan method.

24. The capacitive touch system of claim 23, wherein the process is configured to control the driving and sensing unit so that the driving signals in the second phase are provided to a pattern area surrounding a touch pattern corresponding to the first and second axis coordinates of the first frame in a partial scan method.

25. The capacitive touch system of claim 24, wherein the processor is configured to select one of the first and second axis coordinates of the first frame as a touch coordinate of the touch panel when a multi touch is generated when determining first and second axis coordinates having a relatively high coordinate precision among the first and second axis coordinates of the first and second frames as a touch coordinate of the touch panel.

26. The capacitive touch system of claim 22, wherein the processor comprises:
 a two-dimensional code conversion unit configured to convert the sensing signals into a two-dimensional code value;
 a multi-frame coordinate extraction unit configured to calculate the two-dimensional codes according to a coordinate extraction algorithm to obtain first and second axis coordinates of the first and second frames, and to extract a touch coordinate of the touch panel having a relatively high coordinate precision among the first and second axis coordinates of the first and second frames; and
 an output transmission part configured to output the extracted touch coordinate.

27. The capacitive touch system of claim 26, wherein the processor further comprises a transceiver control unit configured to control the second group drivers and the first group sensors to be inactivated through the driving and sensing unit when activating the first group drivers and the second group sensors.

28. The capacitive touch system of claim 22, wherein when the first direction is an X-axis direction, the second direction is a Y-axis direction.

29. The capacitive touch system of claim 28, wherein when the first axis coordinate is a coordinate of the X-axis direction, the second axis coordinate is a coordinate of the Y-axis direction.

* * * * *